Figure 1:
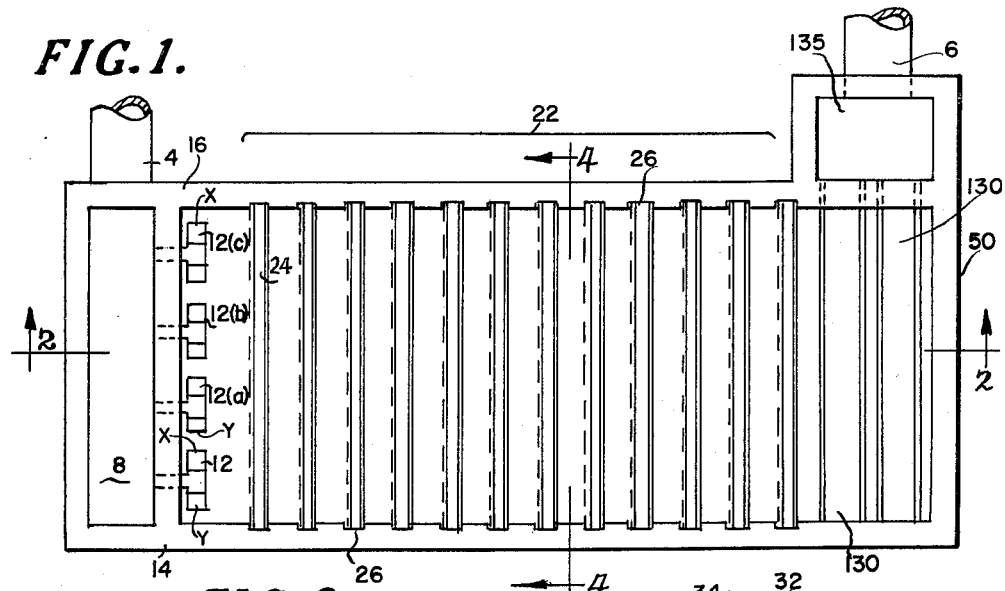

March 7, 1961 A. L. GENTER ET AL 2,973,866
SETTLING TANK
Filed May 14, 1959 3 Sheets-Sheet 1

INVENTORS
ALBERT L. GENTER
RICHARD R. KENNEDY
ROBERT M. KENNEDY
BY Cushman, Darby & Cushman
ATTORNEYS March 7, 1961 A. L. GENTER ET AL 2,973,866
SETTLING TANK
Filed May 14, 1959 3 Sheets-Sheet 2

INVENTORS
ALBERT L. GENTER
RICHARD R. KENNEDY
ROBERT M. KENNEDY

BY Cushman, Darby & Cushman

ATTORNEYS

March 7, 1961 A. L. GENTER ET AL 2,973,866
SETTLING TANK
Filed May 14, 1959 3 Sheets-Sheet 3
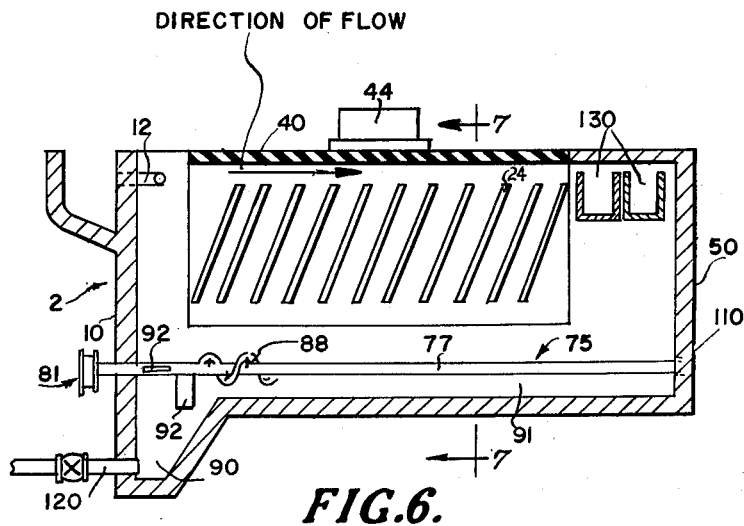
FIG.6.
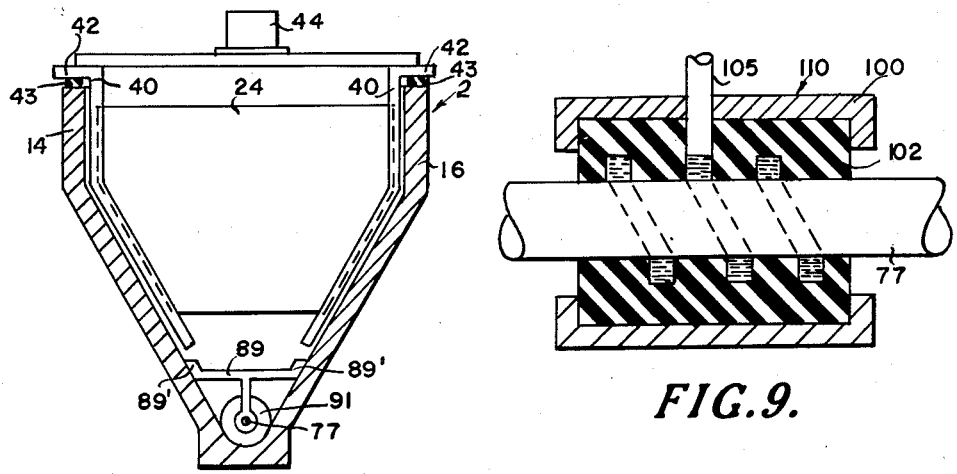
FIG.7.
FIG.9.
INVENTORS
ALBERT L. GENTER
RICHARD R. KENNEDY
ROBERT M. KENNEDY
BY Cushman, Darby & Cushman
ATTORNEYS United States Patent Office 2,973,866
Patented Mar. 7, 1961

2,973,866

SETTLING TANK

Albert L. Genter, Wyman Park Apts., Baltimore 11, Md., and Richard R. Kennedy and Robert M. Kennedy, both of 604 Mission St., San Francisco 5, Calif.

Filed May 14, 1959, Ser. No. 813,231

14 Claims. (Cl. 210—519)

This invention relates to an apparatus for separating dispersed solids from a carrier liquid. The apparatus of this invention finds particular utility when operated as a settling tank for the treatment of sewage, and the apparatus is particularly concerned with the manner in which the solids content of sewage is separated from the liquid content.

As is apparent from a review of the art, in all settling tanks there is a circulating liquid from which dispersed particles are to be separated. For separation by settling velocity of the smallest particle must exceed the velocity of any rising liquid which may act upon that particle either directly or indirectly. At the same time, for efficient operation, the overflow rate of the tank must be maintained at a high level for efficient operation.

Prior to this invention, it was believed that the only efficient way to meet the required velocity relation between rising liquid and settling particles was to use a tank of the well-known "multi-tray" type construction. Such tanks had at least one severe disadvantage. The ever-present bacterial action in and on sewage solids could not be controlled. As a result, the "multi-tray" devices became foul smelling under the action of the anerobic bacteria and required continuous cleaning. Not only were operating costs increased, but efficiency was greatly reduced due to the time involved in cleaning shut-downs. It was known that elongated tanks are not subject to the severe disadvantage of the "multi-tray" type devices because in rectangular units the bacterial action can be controlled, but heretofore the required relation between velocities could not efficiently be achieved.

In prior rectangular or elongated tanks, the overflow rate necessarily was maintained at a low level in order to prevent the velocity of rising liquids from exceeding the velocity of the small particles to be settled. Thus, although elongated tanks were desirable from a bacteria control standpoint, their operation was inefficient because whenever high overflow rates were maintained, small particles could not be separated from the carrier liquid.

The first primary object of this invention is to provide an efficient rectangular or elongated settling tank, that is, one in which the settling velocity of small particles exceeds the velocity of rising circulating liquids when high overflow rates are maintained.

Aside from the overflow rate and velocity considerations which must enter into settling tank design, the inlet design is of particular importance. For proper settling of particles from a carrier liquid, it is necessary to provide a laminar or sheet flow of the carrier over the surfaces on which the particles are to be settled. At the same time, the inlet cannot be so constructed as to be susceptible of easy clogging, and cannot be located merely at any level within the tank. The laminar or sheet flow exiting from the inlet must be confined to a shallow depth, to minimize the distance a particle to be settled must travel and the surfaces on which settling is to take place should be as large as possible so as to give maximum surface area for intercepting descending particles. The second primary object of this invention is to provide a settling tank of elongated construction in which the settling surfaces are of maximum area, and the inlet construction is such as to cause the incoming liquid carrying dispersed particles to assume a shallow laminar flow over the settling surfaces.

In order to achieve maximum settling surface area, it has heretofore been suggested that baffles be used within the settling tank. However, two factors have been neglected in such suggestions, namely, the direction and angle of slope of the baffle, and the depth relation of the baffle surfaces to the laminar flow. Accordingly, the third primary object of this invention is to provide a rectangular settling tank in which the baffle arrangement is disposed with respect to the inlet device so as to render the most efficient settling of particles carried by incoming carrier liquid.

In addition to proving a settling tank as described above, the invention provides for an improved means for carrying separated particles or sludge from the settling surfaces to the sludge outlet chamber of the tank. Specifically, the invention provides for a fully submerged sludge conveyor which acts in conjunction with the other components of the improved tank to increase efficiency.

Although the general primary objects of the invention have been set forth above, specific objects of this invention are important. One of the specific objects of this invention is to provide an inlet means which comprises a series of T's so disposed as to cause the velocity of incoming liquid to be reduced substantially by the counter action of streams of incoming liquid upon one another. A still further specific object of this invention is to provide a settling tank having the above described features, and in addition a series of baffles disposed so as to lean away from the inlet distributors at an adjustable angle less than the angle of repose of the solids settling from incoming carrier liquid.

It is important that the collection of solids on any settling surface be kept as thin as possible so that trapped liquid between the particles may easily escape, and therefore, a further specific object of this invention is to provide a rectangular settling tank in accordance with the above objects, but further including means to vibrate or agitate the baffle arrangement so as to hasten the travel of settled particles to the sludge conveying means, and keep the settling surfaces free of slime deposits, sludge deposits, or any over-accumulations.

Still further specific objects of this invention are to provide a rectangular settling tank in accordance with the above objects, and: (1) having a ribbon and/or cut-flight conveyor for transporting sludge to the outlet chamber of the tank so as to easily handle the sticky accumulations of settled particles, (2) having a clear liquid overflow collecting launder at the overflow end of the tank, to provide for even overflow, (3) having mechanical means to vary the inclination or slope of the baffles within the tank, (4) having hydraulically lubricated supporting bearings for the sludge conveying means so as to prevent bearing failure or clogging and (5) having means which provide for adjustment of the level of the top of the baffles with respect to the top level of liquid within the tank.

As suggested at the outset of this application, the invention is concerned with an apparatus for settling dispersed particles in a carrier liquid from the carrier. Accordingly, a still further object of this invention is to provide an improved apparatus for settling sewage solids from a mixture of solid and liquid sewage, which apparatus provides for efficient operation within a rectangular settling tank. Basically, the invention provides for feeding sewage composed of dispersed particles in a carrier liquid into a settling tank, directing the carrier into separate streams entering the tank in opposing relation whereby the carrier begins travel through the tank as a non-turbulent laminar flow, allowing the carrier to flow through the tank at a rate which allows the dispersed solids therein to settle therefrom, intercepting said particles as they settle from said carrier on inclined surfaces, moving the inclined surfaces to hasten movement of the particles to the bottom of the tank, and conveying the particles collected on the surfaces to a single outlet location.

As should be apparent from the above general discussion of the state of the art, and objects of the invention, the apparatus provided by the invention basically comprises an elongated tank, inlet means within said tank for directing an incoming liquid carrier into opposing streams, a series of baffles within said tank leaning away from said inlet means at an angle equal to or less than the angle of repose of particles carried by said incoming liquid carrier, conveying means under said baffles for conveying the particles collected on said baffles to the sludge outlet end of said tank, and means for moving said baffles to hasten movement of particles deposited thereon toward the bottom of said baffles and to said conveying means.

Objects other than those specifically set forth above, will become apparent from the following detailed description of illustrative embodiments of the invention. The illustrative embodiments are best understood if the description is considered with the annexed drawings, wherein:

Figure 1 is a plan view of an improved settling tank constructed in accordance with the teachings of this invention.

Figure 2 is a cross-sectional view of the tank shown in Figure 1, but showing in addition details of construction of means for agitating the baffle structure and means for conveying settled sludge to an outlet channel.

Figure 3 is a fragmental view of the tank shown in Figure 1, but presenting a modified form of inlet distributor constructed in accordance with the teachings of this invention.

Figure 4 is a cross-sectional view of the tank shown in Figures 1 and 2, but presenting a modified form of baffle structure provided by this invention.

Figure 5 is a cross-sectional view of a multiple tank arrangement constructed in accordance with the teachings of this invention.

Figure 6 is a side cross-sectional view of an improved settling tank provided by this invention and having a vibratable baffle unit.

Figure 7 is a cross-sectional view of the tank shown in Figure 6, Figure 7 having been taken on line 7—7 of Figure 6.

Figure 8 is a fragmental detailed view of the baffle-slot arrangement shown in Figure 2.

Figure 9 is a cross-sectional view of a bearing structure which is preferably used in tanks constructed under the teachings of this invention.

Figure 10 is a fragmental detailed view of an overflow launder adjusting means.

In the drawings, the numeral 2 has been used to generally designate a rectangular or elongated settling tank constructed in accordance with the teachings of this invention. By referring to Figure 1 it will be seen that an inlet conduit 4 and an over-flow outlet conduit 6 communicate with the interior of the tank 2. Sewage consisting of a carrier liquid with dispersed particles therein, or other mixtures of settleable solids suspended in liquids, enters a trough 8 disposed at the inlet end 10 of tank 2, and pass from trough 8 into the central portion of the tank through a series of inlet distributors 12, 12(*a*), 12(*b*) and 12(*c*).

The preferred design of the distributors is shown in Figure 1. They have a T shape and are disposed in a horizontal row such that streams of liquid exiting from adjacent ends of successive distributors meet one another head on. For example, the stream of unsettled mixtures leaving end X of distributor 12 directly meets the stream of mixtures leaving end Y distributor 12(*a*). The two streams inlet velocities are in direct opposition and as a result, the inlet velocity of one stream cancels the inlet velocity of the other stream so that the liquid introduced into the tank through the adjacent ends of the successive conduits has substantially no inlet velocity. Because of this, the liquid assumes a substantially non-turbulent sheet or laminar flow through the tank.

End Y of distributor 12 and end X of distributor 12(*c*) are disposed adjacent the side walls 14 and 16 of tank 2, and the streams of incoming sewage exiting from these two ends of the distributors hit the side walls. The side walls act as baffles to slow down and distribute the end streams.

The T distributors are obviously tubular structures, and they may have any diameter which seems suitable. They eliminate the need for the widely used perforated inlet plates which are easily clogged. Although four inlet distributors are shown in Figure 1, it should be understood that any number may be used.

In Figure 3, an alternate form of inlet distributor is presented. By referring to this figure, it will be noted that the T distributors of Figure 1 have been replaced by straight pipes 18, 18(*a*), 18(*b*) and 18(*c*) and baffle plates 20, 20(*a*), 20(*b*) and 20(*c*). With this type of distributor, the velocity of incoming sewage streams is materially reduced when the streams hit against the baffles, and the flow of sewage passing from the baffles is substantially a non-turbulent laminar flow. The action is similar to that achieved with the T distributors of Figure 1. Streams hitting the baffles initially are slowed down, but spread laterally and meet head on with streams spreading from adjacent baffles so that inlet velocities are in direct opposition. This results in substantially cancelling the inlet velocities so that all incoming sewage assumes non-turbulent sheet flow.

Notwithstanding the fact that the inlet distributor arrangements shown in Figures 1 and 2 are preferable, any inlet distributing means may be used which insures substantial elimination of the energy of sewage introduced into the tank and which is not easily rendered inoperative by clogging.

Unsettled mix which leaves the inlet distributing means, and has assumed a non-turbulent laminar flow, passes to the tank sedimentation zone 22. Disposed within zone 22 are a plurality of baffles 24 which are held in place preferably in channeled grooves 26 on the side walls 14 and 16 of the tank. As shown in Figure 2, the grooves are V-shaped, and the bottoms of the baffles may be hinged at their lower end so that the baffles may be moved from a position adjacent one leg of the V's to a position adjacent the other leg of the V's. Of course, any construction other than V-shape may be used if desired.

The movement of the baffles is more clearly presented in Figure 8 where one leg of V groove 26 is designated as P and the other leg is designated as Q. Baffle 24 as shown is pivotally connected by means of rod 28 to either side wall of the tank, and the baffle obviously can be moved from a position where it abuts leg P to a position where it abuts leg Q of the groove 26. The pivotal connection by means of rod 28 is merely exemplary, and it should be understood that any pivotal connection may be used. In fact, in some instances it may be desirable to make no secure pivotal connection, and allow the baffles merely to rest in the bottoms of the V groove 26.

The baffles 24 may be solid sheets, as shown in Figures 1, 2 and 8, or they may comprise a series of interconnected strips as shown in Figure 4. Regardless of the baffle construction, according to the preferred embodiment of the invention, the baffles may be all linked to a bar or rod 27 which extends lengthwise through the tank 2 and is preferably disposed above the liquid level in the tank. If bar 27 is reciprocated, the baffles will reciprocate with it so that the angle or slope of the baffle can be adjusted to any angle desired. Moreover, if bar or rod 27 is periodically reciprocated, the baffles are periodically moved, and any material which has settled thereon is shaken loose. This is an important feature of this invention, as will be explained more fully hereinafter.

Figure 2:
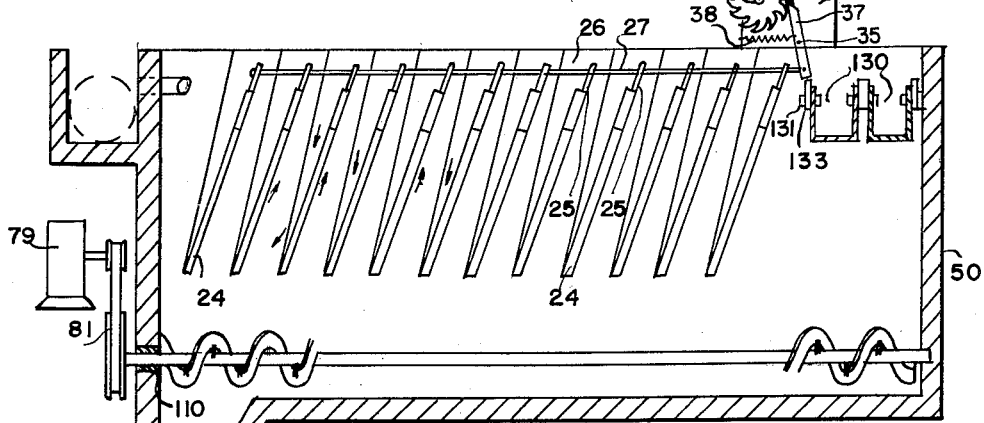

In Figure 2 an exemplary mechanical means for reciprocating rod 27 and thereby baffles 24 is designated generally by numeral 30. The mechanical means comprises a ratchet gear 32 secured to a shaft 34 which may be driven by a motor (not shown) through suitable gearing (not shown) or directly. A lever 37 pivoted about point 35 and coupled to rod 27 bears against the teeth on ratchet gear 32. The lever 37 is biased toward the ratchet gear by spring 38 so that as the extremities of the ratchet teeth pass the end of lever 37 bearing thereagainst, the lever is pulled in. As is apparent, the ratchet teeth cause reciprocation of rod 27 and baffles 24.

A modified form of baffle structure provided by the invention is shown in Figures 6 and 7 wherein it will be noted that the baffles 24 are supported by a frame 40. The frame has side extensions 42 which are adapted to rest upon walls 14 and 16 of tank 2. Between the extensions and the protrusions, there is disposed a resilient pad 43 so that the whole frame including the baffles may be vibrated within the tank. A vibrator 44 which may be either electrical or mechanical, or a combination of both, is carried on the frame and functions to agitate the baffles in a similar manner to the mechanical ratchet means 30.

The baffles 24 may be rigidly secured to the frame 40 by any appropriate means, e.g., welding, screws, or the like or they may be pivotally coupled to the frame in slots so that their inclination or slope can be varied.

It should be understood that the particular method of securing the baffles in place forms no part of this invention. However, the provision of the baffle structure, and the provision of some means for agitating the baffles are essential features of this invention.

The disposition of the baffles and relation between the baffles and the inlet distributors is also of critical importance. In all modifications of the invention the baffles 24 slope away in the direction of the laminar flow, that is, with the top edges of the baffles leaning away from the inlet distributors, or toward the rear edge 50 of tank 2. The angle of inclination of these baffles should be 20°, or less than the natural slope or angle of repose assumed by the granular or semi-fluid material settling out of the mixture and onto the inclined surfaces 24.

The angle of inclination of the baffles must be comparatively small, that is, less than 20° because for efficient operation the angle must be less than the angle of repose of solids settling on the baffles. It is difficult to specify the exact angle by formulation, and the important factor is that the baffles slope away from the inlet distributors.

The direction of flow of liquid through the settling tank is shown by arrows in Figure 2. It will be noted that the material settles out of the laminar flow at the top of the tank and on to the inclined baffle surface. Naturally the settling material carries with it a certain amount of liquid. As the settling material hits the baffle, it begins the glide down the baffle and the speed of the travel of the settled material down the baffle may be periodically or continually augmented by the mechanical agitation of the baffles as pointed out above. The inclination of the baffles naturally increases the settling capacity of the tank because with inclined baffles the thickness of the layer of settling solids on the baffle is at all times relatively thin. Thus, water or other liquid which is to be separated from the settled material only need pass through a thin layer of solids in order to become part of the circulating liquids. To express this another way, the number of surface pores available for egress of water is increased by inclining the baffles.

By referring to Figures 2 and 6 particularly, it will be noted that the inlet distributors 12, 12(a), 12(b) and 12(c) are disposed in substantially the same horizontal plane as the disposition of the baffles 24. Because of this relationship the laminar flow issuing from the inlet distributors is in juxtaposition to the top of the baffles so that settling material need travel a minimum distance before being intercepted by a baffle surface.

As the material which has settled out of the incoming sewage slides down the baffle water is expelled therefrom as suggested above, and the expelled water passes upwardly against the undersurface of the preceding baffle. The settled material upon leaving the bottom of the baffles drops onto a sludge conveying unit 75. The conveying unit comprises a shaft 77 which extends lengthwise through the settling tank and is driven by a motor 79 through a suitable pulley or gear arrangement 81. The shaft 77 carries a screw or ribbon conveyor 88. The speed at which the shaft and thereby the conveyor is driven is dependent on the speed of the motor 79, and preferably the motor is of the variable speed type so that conveying of the sludge at the bottom of the tank may be performed at any desired rate. The shaft 77 is preferably mounted in stuffing glands of the type shown in Figure 9. These glands comprise a housing 100 which contains a soft rubber bearing 102 having molded helical grooves therein. Water is introduced under pressure through an inlet pipe 105 so that the helical grooves are constantly filled with a fluid under pressure. This type of bearing prevents clogging and wear and insures continuous operation of the conveyor.

As will be seen by reference to Figures 2 and 6 a sludge outlet channel 90 is provided at the bottom of the front of the tank and the conveyor 75 delivers sludge to the channel. The conveyor may have larger screw blades toward its forward end to more efficiently carry the heavier quantities of sludge, or as shown in Figure 6 paddle blades may be provided adjacent the sludge outlet channel in order to thereby mix the heavy sludge previous to its discharge from the settling tank via outlet pipe 120.

It should be pointed out that the conveyor should be either of the ribbon or cut-flight type since both of these types of conveyors are particularly adapted to convey sticky material. A solid flight conveyor tends to tunnel through such material without moving it. The preferred embodiment of the invention provides for utilizing the ribbon conveyor since this type most efficiently transports the settled solids.

In addition to the components of the settling type tank provided by his invention, it should be pointed out that overflow launders, or troughs 130 are disposed at the rear of the settling tank near the top liquid level so that the clear liquid to be drained from the tank overflows evenly. As shown in Figure 1, one of each of the launders flows into an overflow collecting chamber 135.

In the foregoing description, the operation and components of the settling tank provided by this invention have been explained in some detail. However, certain important factors of the invention need still be emphasized. First of all, it should be understood that the level of the top of the baffles within the tank can be adjusted. By referring to Figure 2 it will be noted that if the rod 27 is moved forward from the position shown the top of the baffles will rise. Thus, the rod 27 not only allows for adjustment of the baffle angle, but it also allows for adjusting the depth which particles must travel to settle from the incoming laminar flow. The overall construction of the settling tank is of primary importance because it allows for settling even very small particles at high overflow rates. The provision of inclined baffles at an angle less than the angle of repose of the solids to be settled, and the provision of means to agitate the baffles necessarily speeds up the settling out operation, and a speed-up in the settling out operation allows for flowing a greater quantity of sewage through the tank per unit time. Thus, the overflow rate can be increased when the improved tank provided by this invention is used.

The particular materials from which the components of the settling tank are constructed are not factors of this invention, but it should be understood that the materials should be of types which do not react chemically with the components of the sewage to be treated.

Although the coupling between baffles 24 and rod 27 has been described only generally above, it should be apparent from Figure 2 that each baffle carries an extension 25 on one side thereof, which extension is suitably coupled (by bolt, or weld, or the like) to rod 27. Similarly, lever 37 is suitably coupled to rod 27 by any equivalent means. The extensions 25 are out of the way of the flow when disposed on the sides of the baffles, and thus do not render the flow turbulent.

Figure 4:
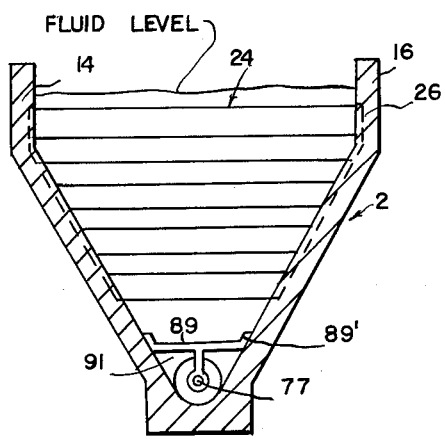
Figure 3:
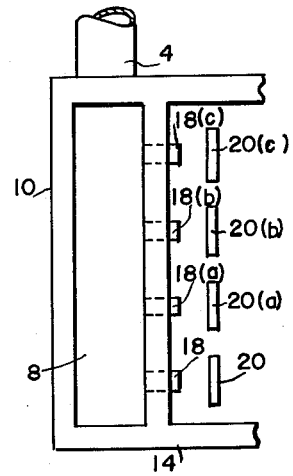

A bracket means 89 may be utilized for supporting the conveyor shaft 77 as shown in Figures 4 and 7. The bracket means gives the shaft support in addition to that which it receives from the bearings 110 (Figures 2 and 9). Bearings similar to those designated by numeral 110 may be used in the bracket means 89 to insure flawless operation. As shown, the bracket means is generally T-shaped, and has extensions 89' which fit against the walls of tank 2.

The walls of the tank slope toward one another as shown, and the angle of slope preferably is less than the angle of repose of the particles to be settled. In fact, best results are obtained when the angle of slope of the side walls is substantially equal to the angle of slope of the baffles. Since the baffles may be agitated through a small angle, the angle of slope of the side walls can only be exactly equal to the angle of slope of the baffles in one position. Therefore, an average of the angle of slope of the baffles is preferably used for the angle of slope of the side walls.

Naturally the slope of the side walls facilitates travel of sludge collected on the baffles toward the bottom of the tank and into the sludge collection chamber 91. It is within this chamber that the sludge conveying means 75 rotates to move the sludge to the outlet.

Figure 5:
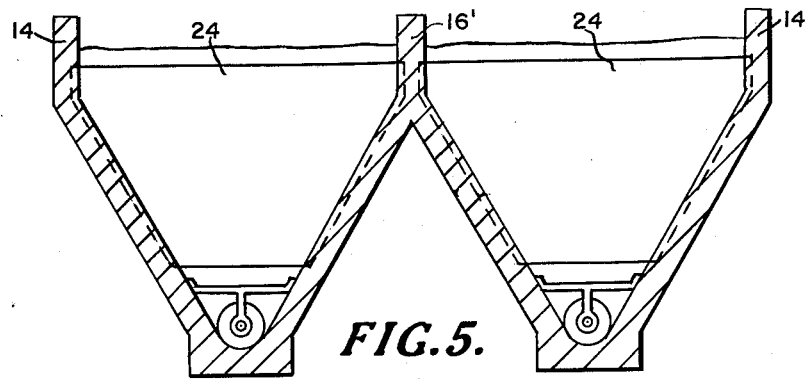

In addition to providing a rectangular settling tank which allows for settling small particles at high overflow rates, this invention provides a settling tank which can be easily used in a multi-tank system. The basic multi-tank arrangement is shown schematically in Figure 5, and by referring to that figure, it will be noted that a common central wall 16' may be used between two tanks.

In all of the embodiments of the invention presented in the drawings, the sludge outlet channel 90 and conveyor drive 79, 81 have been shown at the front of the tank 2, however, it should be apparent that the channel or drive, or either or both, could be located adjacent the back end 50 of the tanks. This is one example of the ease with which components can be changed to different locations, and a definite advantage of the improved tank provided by this invention over the settling tanks of the prior art.

Figure 10:
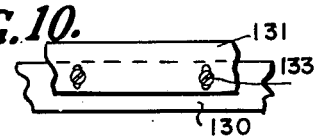
Figure 8:
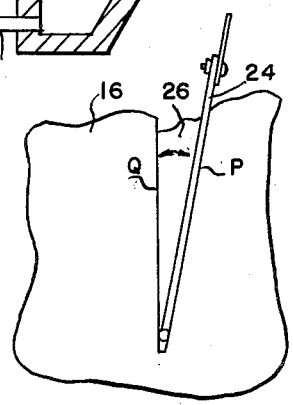

Although multiple overflow launders have been illustrated in the drawings, it should be apparent that a single overflow launder may be provided if desired. Multiple launders insure uniform overflow, but in certain instances a single launder may be entirely adequate. In any case, the launders should have adjustable extensions, such as those designated by numeral 131 in Figure 2, so as to allow for control or overflow level. Extensions 131 are coupled to the launders by screws 133 as shown most clearly in Figure 10, but any suitable coupling means which allows for adjustment may be used. The adjustment of the overflow controls the depth of the laminar flow as does the adjustment of the height of the baffles.

In order to allow for adjustment of settling rate, the vibrator 44 and mechanical means 30 which control baffle agitation should be adjustable in frequency as well as in magnitude. Vibrators are now manufactured with such adjustment, and if the pivot point of lever 37 is moved, the mechanical means 30 (Figure 2) becomes adjustable in magnitude of agitation.

After considering the foregoing description of the invention, the operation of the tank should be apparent. Fluid sewage is introduced into the tank and passed through distributors which provide a laminar non-turbulent flow. Baffles are disposed in the tank, and these baffles intercept particles which settle from the carrier fluid. The baffles are really inclined planes down which the settled particles slide after interception, and the invention provides for agitating the baffles or inclined planes to hasten movement of sludge toward the bottom of the tank. In addition, the invention provides for conveying the settled sludge to an outlet location. As part of the apparatus described herein, the incoming mixture of suspended solids and liquids is divided into streams which oppose one another upon entrance into the tank, or which oppose one another after being stopped and laterally dispersed.

The foregoing description will undoubtedly suggest many modifications to those of ordinary skill in the art, and therefore, it is intended that the description be interpreted as illustrative and not in a limiting sense.

We claim:

1. A settling tank comprising an elongated containing means having a bottom wall, side walls and end walls, fluid inlet means and fluid outlet means communicating with opposite ends of the interior of said tank, a fluid inlet channel communicating with said fluid inlet means, a series of fluid distributors communicating with said fluid inlet channel, said fluid distributors comprising means for directing fluids in opposing directions whereby the fluid entering said tank through said distributors assumes a substantially non-turbulent laminar flow, a plurality of baffles disposed in said tank over which fluid exiting from said distributors passes, said baffles having top and bottom ends and being inclined with the bottom ends closer to said distributors than the top ends, a collection chamber located below the bottom ends of said baffles for collecting settled solids, an outlet chamber, and submerged conveying means for transporting settled materials from said collection chamber to said outlet chamber.

2. A settling tank as defined in claim 1, wherein said means for directing fluids in opposing directions comprises a series of T-shape tubes.

3. A settling tank as defined in claim 2 and further including means to agitate said baffles.

4. A settling tank as defined in claim 3 wherein said conveying means comprises a spiral conveyor, and wherein said conveyor is disposed substantially parallel with the bottom wall of said containing means.

5. A settling tank as defined in claim 4 wherein said baffles are moveably mounted within said tank, and wherein said tank further includes means for adjusting the level of said baffles with respect to the top liquid level of said tank.

6. A settling tank as defined in claim 4, and further including overflow means disposed near the fluid outlet means.

7. A settling tank as defined in claim 1 wherein said means for directing fluids in opposing directions comprises a series of tubular outlets and a series of deflection plates disposed in alignment with said tubular outlets.

8. A settling tank as defined in claim 7 and further including means to agitate said baffles and means to change the level of the top ends of said baffles with respect to the top liquid level in said containing means.

9. A settling tank as defined in claim 8 wherein said conveying means comprises a spiral sludge conveyor.

10. A settling tank as defined in claim 1 and further including means to agitate said baffles.

11. A settling tank as defined in claim 10 wherein said means for agitating said baffles comprises a reciprocal rod and mechanical means for reciprocating said rod.

12. A settling tank as defined in claim 10 wherein said means for agitating said baffles comprises a vibrating means directly coupled with said baffles.

13. A settling tank as defined in claim 12 wherein said baffles are coupled to said vibrating means by means of a frame, and wherein said frame is adapted to support said baffles within said containing means.

14. A settling tank as defined in claim 1 wherein said fluid distributions are disposed at least substantially in alignment with the top of said baffles.

References Cited in the file of this patent

UNITED STATES PATENTS

| | | |
|---|---|---|
| 2,678,730 | Coulter | May 18, 1954 |
| 2,688,402 | Butterworth | Sept. 7, 1954 |
| 2,702,124 | Stengel | Feb. 15, 1955 |

FOREIGN PATENTS

| | | |
|---|---|---|
| 10,557 | Great Britain | 1908 |